(12) United States Patent
Borlodan

(10) Patent No.: US 12,024,073 B2
(45) Date of Patent: Jul. 2, 2024

(54) MOTOR VEHICLE LATCH, IN PARTICULAR MOTOR VEHICLE BACKREST LATCH

(71) Applicant: Kiekert AG, Heiligenhaus (DE)

(72) Inventor: Stelian Borlodan, White Lake, MI (US)

(73) Assignee: Kiekert AG, Heiligenhaus (DE)

( * ) Notice: Subject to any disclaimer, the term of this patent is extended or adjusted under 35 U.S.C. 154(b) by 127 days.

(21) Appl. No.: 17/889,699

(22) Filed: Aug. 17, 2022

(65) Prior Publication Data
US 2024/0059197 A1 Feb. 22, 2024

(51) Int. Cl.
*B60N 2/36* (2006.01)
*B60N 2/22* (2006.01)
*E05B 17/00* (2006.01)

(52) U.S. Cl.
CPC ........... *B60N 2/366* (2013.01); *B60N 2/2245* (2013.01); *E05B 17/0041* (2013.01); *E05B 17/0045* (2013.01); *B60N 2205/20* (2013.01)

(58) Field of Classification Search
CPC .. B60N 2/2245; B60N 2/366; B60N 2205/20; B60N 2/42709; E05B 17/0041
See application file for complete search history.

(56) References Cited

U.S. PATENT DOCUMENTS

| | | | | |
|---|---|---|---|---|
| 7,070,236 B2 * | 7/2006 | Kawashima | ....... | B60N 2/42709 297/216.13 |
| 7,188,872 B2 * | 3/2007 | Kalargeros | ............. | E05B 85/26 292/216 |
| 8,210,606 B2 * | 7/2012 | Meghira | ............ | B60N 2/42709 297/472 |
| 8,870,288 B2 * | 10/2014 | Heeg | .................. | B60N 2/02246 297/378.13 |
| 9,050,911 B2 * | 6/2015 | Wieclawski | ......... | B60N 2/2245 |
| 9,180,799 B2 * | 11/2015 | Teufel | .................... | B60N 2/206 |
| 9,216,672 B2 * | 12/2015 | Windecker | ............. | B60N 2/366 |
| 9,382,735 B2 * | 7/2016 | Rosales | .................... | E05B 85/26 |
| 2005/0062295 A1 * | 3/2005 | Ketelsen | ................. | E05B 77/38 292/216 |
| 2010/0176621 A1 * | 7/2010 | Aufrere | .............. | B60N 2/42745 296/68.1 |

(Continued)

FOREIGN PATENT DOCUMENTS

| DE | 102014217506 A1 * | 3/2016 | ......... B60N 2/02246 |
|---|---|---|---|
| FR | 2924648 A1 * | 6/2009 | ........... B60N 2/4214 |

(Continued)

*Primary Examiner* — Timothy J Brindley
(74) *Attorney, Agent, or Firm* — Renner, Otto, Boisselle & Sklar, LLP

(57) ABSTRACT

A motor vehicle latch, in particular a motor vehicle backrest latch, which is equipped with a locking mechanism consisting substantially of a catch and a pawl. A latch housing having a recess is also implemented. In addition, a damping means at the end side of the recess, a latch holder entering the recess in the direction of entry transferring the locking mechanism to its closed position, thereby moving against the damping means. In addition, the damping means has a plurality of recesses and at least one web. According to the invention, the web is designed as an arched web and its highest arch is convexly curved against the direction of entry of the latch holder.

15 Claims, 4 Drawing Sheets

(56) References Cited

U.S. PATENT DOCUMENTS

| | | | | |
|---|---|---|---|---|
| 2011/0006577 A1* | 1/2011 | Muller | ............... | B60N 2/366 |
| | | | | 297/378.13 |
| 2014/0210220 A1* | 7/2014 | Limberg | ............ | E05B 83/24 |
| | | | | 292/216 |
| 2016/0108649 A1* | 4/2016 | Rosales | ............ | E05B 85/243 |
| | | | | 292/194 |
| 2019/0359090 A1* | 11/2019 | Robertson | ........... | E05B 77/38 |
| 2021/0172220 A1* | 6/2021 | Bishop | ............... | E05B 77/38 |

FOREIGN PATENT DOCUMENTS

| | | | | |
|---|---|---|---|---|
| WO | WO-2012066274 A1 * | 5/2012 | ............ | B60N 2/24 |
| WO | 2019224630 A1 | 11/2019 | | |

* cited by examiner

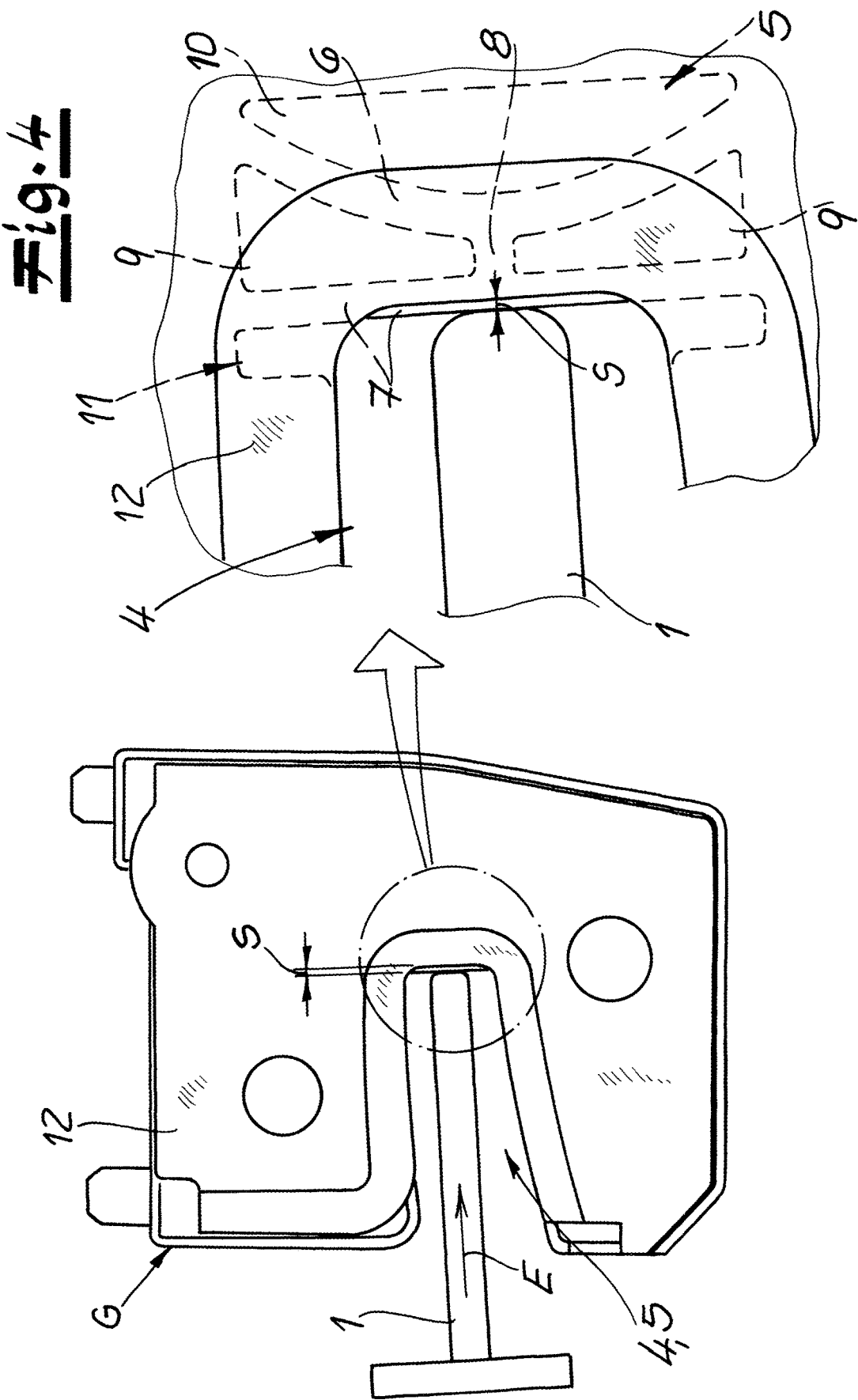

MOTOR VEHICLE LATCH, IN PARTICULAR MOTOR VEHICLE BACKREST LATCH

FIELD OF DISCLOSURE

The invention relates to a motor vehicle latch, in particular a motor vehicle backrest latch, comprising a locking mechanism consisting substantially of a catch and a pawl, furthermore comprising a latch housing having a recess, and comprising a damping means at the end side of the recess, a latch holder entering the recess in the direction of entry transferring the locking mechanism into its closed position, thereby moving against the damping means, and the damping means having a plurality of recesses and at least one web.

BACKGROUND OF DISCLOSURE

Motor vehicle latches and associated latch holders usually interact with one another in order to assume at least one closed position. In this closed position, the latch holder is caught with the help of the catch and the pawl ensures that the catch is secured in this closed position. In addition to such a closed position or main closed position, the locking mechanism and the motor vehicle latch can also assume a pre-closed position or pre-ratchet position if the main closed position is identified with a main ratchet position.

Such motor vehicle latches are used, for example, as motor vehicle door latches, as motor vehicle hood latches, as motor vehicle fuel filler flap latches, as motor vehicle flap latches, etc. A so-called motor vehicle backrest latch is present and particularly preferred within the scope of the invention. This is a motor vehicle latch which is generally connected in or on a backrest of a foldable motor vehicle seat. In contrast, the latch holder is connected to the motor vehicle body. In general, however, it is also possible to proceed in reverse.

In this way, for example, a backrest of a rear motor vehicle bench seat can be folded down onto the seat surface in order to thereby enlarge a rear loading area in the motor vehicle. In order to move the backrest back into its mostly vertical and upright position, the backrest is folded up from the seat surface and locked by the interaction between the body-side latch holder and the backrest-side motor vehicle latch.

In order to avoid disturbing noises between the typically metallic latch holder on the one hand and a likewise metallic latch plate mounting the locking mechanism or the metallic locking mechanism, the damping means described in the introduction is used during this locking process, i.e. the assumption of the closed position. This damping means ensures that the latch holder is caught in the locking mechanism in its closed position, but at the same time that it moves against the elastic damping means and is thereby, as it were, clamped and fixed or "immobilized." As a result, there are no undesirable "creaking" or "metallic" noises even when driving and when the rear seat bench is occupied or not occupied. By virtue of the damping means, metallic contact between the latch holder, on the one hand, and the latch plate, on the other hand, is avoided.

In the generic state of the art according to WO 2019/224 630 A1, the damping means is equipped for this purpose with a plurality of entering the recess perpendicular to the direction of entry of the latch holder. A front side web also has a bulge against which a stop web together with the latch holder can move flexibly. This has proven itself in principle.

In practice, however, there are increasing requirements to the effect that, compared to the previous procedure, even higher forces should be absorbed by the damping means. In addition, the bulge realized according to WO 2019/224 630 A1 requires that the latch holder does not move, for example, at an angle or offset against this bulge. Subsequently, in particular in the case of high forces, there is the risk that the damping means will be damaged because individual webs become brittle or even tear. The known damping means is typically designed as a component of the latch housing made of plastics material, if only in order to save the costs for an additional damping means to be implemented. In any case, overall improvements are required with respect to the resistance to forces which occur and are introduced by the latch holder, as well as to the effect that manufacturing tolerances can be mastered during installation. This is where the invention starts from.

SUMMARY OF DISCLOSURE

The invention is based on the technical problem of further developing such a motor vehicle latch in such a way that, compared to the previous state of the art, installation tolerances of the latch holder and the motor vehicle latch can be better managed overall and at the same time higher forces are absorbed by the latch holder.

To solve this technical problem, a generic motor vehicle latch and, in particular, a motor vehicle backrest latch is characterized within the scope of the invention in that the at least one web as part of the damping means is designed as an arched web and its highest arch is convexly curved against the direction of entry of the latch holder.

The invention thus still uses a damping means which is implemented at the end side of the recess in the latch housing. This means that the damping means is typically part of the latch housing. Since the latch housing is generally made of plastics material, whereas a latch case supporting the locking mechanism is made of metal and in particular of steel, the damping means for the latch housing is also made available from the relevant plastics material.

Since the latch housing is generally produced by a plastics injection molding process and, in this context, typically thermoplastics such as polyethylene, polypropylene, polyamide, polycarbonate, etc. are used, the damping means together with the recess is produced in one go as part of the plastics injection molding process together with the latch housing. As a result, the multiple recesses and the specially designed web can be implemented easily and inexpensively, namely in the course of plastics injection molding. According to the invention, an embodiment has now proven to be particularly resistant to forces exerted by the latch holder, in which the web is designed as an arched web and, with its highest arch, is convexly curved against the direction of entry of the latch holder. This convex curvature of the arched web against the direction of entry of the latch holder ensures that the overall forces exerted by the latch holder on the damping means are particularly effectively absorbed and diverted.

The invention is based on the knowledge that forces exerted by the latch holder in its direction of entry on the damping means are diverted practically evenly from the highest arch into the two arched legs and from there on the foot side into a frame that usually encloses the damping means. In this way, by virtue of the arched web implemented according to the invention, significantly higher forces can be absorbed that are exerted by the latch holder on the damping means compared to the damping means as used in the generic state of the art according to WO 2019/224 630 A1.

Another advantage of this specific introduction of force via the highest arch, the two arched legs, and then on the foot side into the frame of the damping means has been found that it absorbs and controls forces of the latch holder that do not act centrally on the damping means. This means that even if the latch holder moves obliquely into the recess and then of course also strikes the damping means provided at the end side of the recess at an angle, this can develop its damping effect, and any damage to the damping means and in particular the webs implemented at this point can be avoided.

This also and in particular applies in the event that the latch holder enters the recess with an offset to a central direction and does not hit the highest arch, which is curved convexly against the direction of entry, but rather a region adjacent to the highest arch. In such a case, too, the forces exerted by the latch holder on the damping means are diverted via the arched web into the two arched legs and from there on the foot side into the frame enclosing the damping means. In this way, any manufacturing tolerances, aging effects, etc. can also be mastered, which are associated, for example, with the fact that the position of the seat back or backrest varies as a result of the installation compared to the latch holder fixed to the body, due to aging effects, etc. The substantial advantages can be seen here.

It has proven itself if, in addition to the arched web, a stop web is implemented for the latch holder moving against it. This stop web is usually designed to run in a straight line. In addition, it has proven itself if the stop web runs transversely to the direction of entry of the latch holder in the recess. In this way, the latch holder usually first moves against the stop web running transversely to the direction of entry, which is thereby deformed and transfers its deformation to the arched web.

In this context, the stop web is mostly supported at the end side in each case. In addition, the design is made so that the stop web is centrally coupled to the arched web. The stop web is also arranged in front of the arched web in the direction of entry of the latch holder, so that the latch holder, when entering the recess, first acts on the stop web, which in turn works on the arched web and elastically deforms it. Since the stop web is centrally coupled to the arched web, even a deviation of the direction of entry of the latch holder entering the recess from a central line ensures that the deforming forces exerted by the latch holder on the stop web are again transmitted largely centrally to the arch web. The arched web in turn introduces the forces via the two arched legs into the frame enclosing the damping means, as has already been described above. For this purpose, the arched web, in each case on the foot side, and the stop web, in each case on the edge side, are generally connected to the frame of the damping means. It goes without saying that the frame of the damping means, like the damping means itself, consists in turn of the plastics material of the latch housing or is produced by reshaping.

In order to realize and implement the necessary flexibility of both the stop web and the arched web, it has proven itself if two recesses separated by a connecting web between the arched web and the stop web are arranged between the arched web and the stop web. In other words, the stop web arranged in front of the arched web in the direction of entry of the latch holder is not coupled directly and centrally to the arched web, but rather via the connecting web. The connecting web also ensures that this describes two separate recesses, namely a lower recess and an upper recess, which are separated from one another by the connecting web and are delimited on the one hand by the stop web and on the other hand by the arched web and the enclosing frame.

The design is further made in such a way that the two aforementioned recesses, together with an arched recess, describe a largely rectangular damping means region. This rectangular damping means region is delimited by the frame which likewise encloses the damping means and which consequently is also rectangular.

The recess in the latch housing consists substantially of an inlet mouth and the damping means region. The damping means region adjoins the inlet mouth in the inlet direction of the latch holder. In addition, the design is usually made in such a way that the inlet mouth opens to a gap and then to the damping means region. In other words, the latch holder first passes the inlet mouth in its direction of entry into the recess and then enters the opening gap. The damping means region, which also opens toward the inlet mouth, adjoins the opening gap. In this way, the gap provided at the front side of the damping means region ensures that the damping means region has the necessary elasticity to be able to securely clamp and "immobilize" the latch holder in the closed position of the locking mechanism—as described above.

Since the metallic latch holder moves on the front side against the damping means or the stop web (made of plastics material), at the same time, any creaking noises can be safely and reliably avoided permanently and effectively even on long time scales, taking into account any installation tolerances as well as aging effects, whereas any contact between the latch holder and the latch plate, on which the locking mechanism is located, is avoided. At the same time, the special design of the damping means with the convexly curved arched web ensures that the latch holder is clamped with great force in the locking mechanism, but the forces that occur can still be perfectly absorbed by the damping means. Any damage to the damping means is not to be feared in this case due to the specially selected design and in particular the arched web provided. The substantial advantages can be seen here.

BRIEF DESCRIPTION OF DRAWINGS

The invention is explained in greater detail below with reference to drawings, which show only one exemplary embodiment. In the drawings:

FIG. 4 shows the latch holder together with the recess and the latch plate when the locking mechanism is closed.

DETAILED DESCRIPTION

A motor vehicle latch is shown in the figures. The motor vehicle latch is not restrictively a so-called motor vehicle backrest latch, i.e. a motor vehicle latch which is installed, for example, in a backrest of a foldable rear seat bench. For this purpose, the motor vehicle backrest latch may be built into the backrest at the edge side and interact with a latch holder 1 connected to the body. In order to fold down the backrest or seat back onto a seat surface, the motor vehicle backrest latch must be opened. In contrast, when the seat back is folded up, the latch holder 1 engages in a locking mechanism 2, 3 consisting substantially of a catch 2 and pawls 3.

Figure 1:
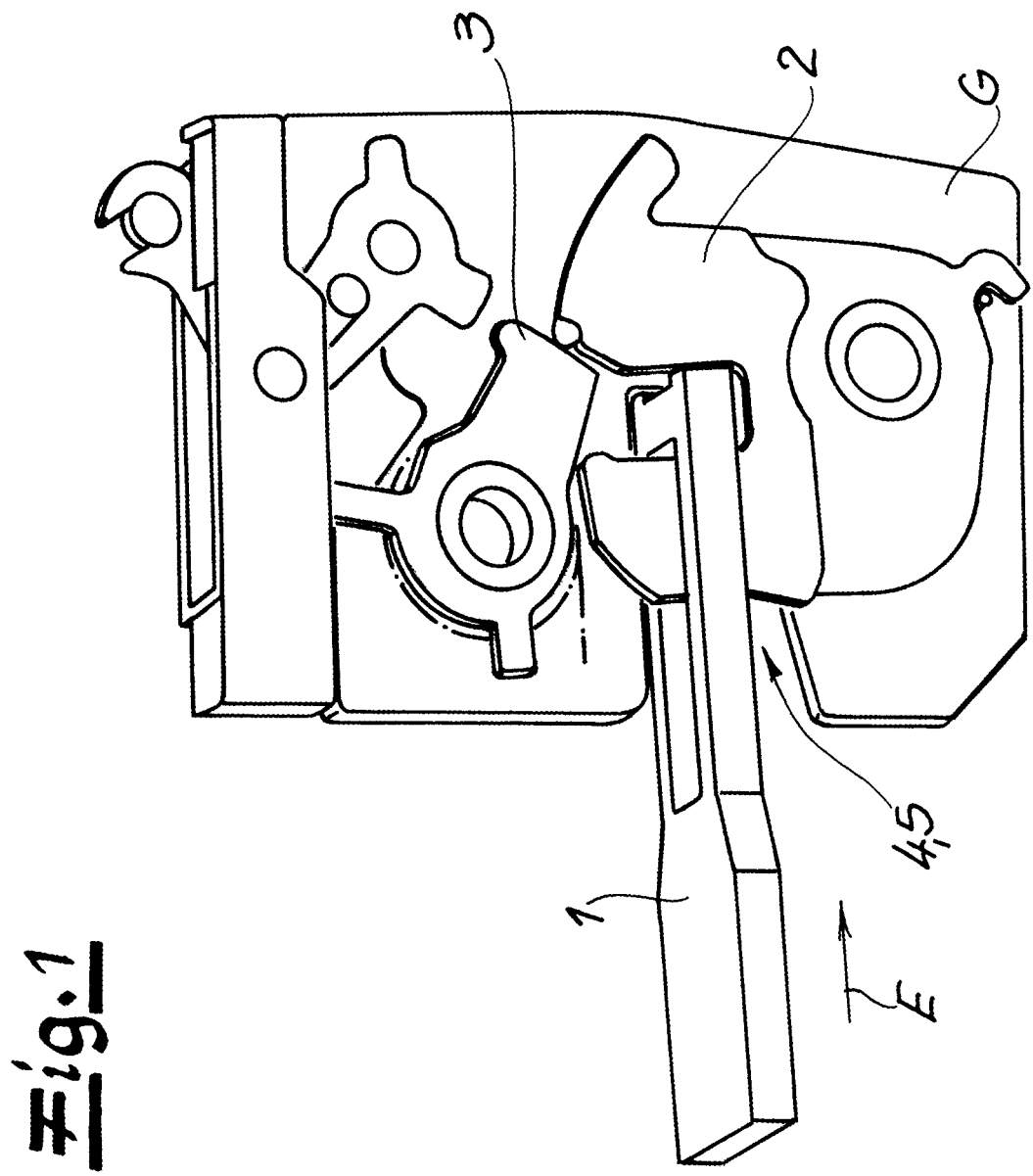
FIG. 1 shows the motor vehicle latch according to the invention in the embodiment as a motor vehicle backrest latch in an overview.

In this case, the locking mechanism 2, 3 is transferred into the closed position shown in FIG. 1. In this closed position, the latch holder 1 is caught by the catch 2, and the pawl 3 which has fallen into the catch 2 ensures that the catch 2 cannot open with the assistance of a spring.

As soon as the seat backrest is moved from its position resting on the seat surface into the predominantly vertical position, the latch holder 1 runs into a recess 4, 5 in the latch housing G in the direction of entry E. This can be seen when comparing FIGS. 1 and 2.

In fact, within the scope of the exemplary embodiment and not by way of limitation, the recess 4, 5 is composed substantially of an inlet mouth 4 for the latch holder 1 and a damping means region 5. A damping means 6, 7, 8, 9, 10 is provided in the damping means region 5. The damping means 6, 7, 8, 9, 10 is placed at the end side of the recess 4, 5. In the direction of entry E in front of the damping means 6, 7, 8, 9, 10, a gap 11 is realized.

The latch holder 1 entering the recess 4, 5 in the direction of entry E now ensures that the locking mechanism 2, 3 is transferred into its closed position shown in FIG. 1. This process is accompanied by the fact that the seat back lying on the seat surface is folded up and locked with the motor vehicle backrest latch with respect to the latch holder 1. The latch holder 1 entering the recess 4, 5 in the direction of entry E not only ensures that the locking mechanism 2, 3 is transferred into the closed position. Rather, the latch holder 1 also ultimately moves against the damping means 6, 7, 8, 9, 10 during this process. In this case, the damping means 6, 7, 8, 9, 10 ensures that, as evidenced by FIG. 4, a distance or gap S remains between the front side end of the latch holder 1 and a latch plate 12 which supports the locking mechanism 2, 3. According to the exemplary embodiment, the gap S assumes values of, for example, 0.5 mm to 1 mm when the latch holder 1 moves, for example, with a force of 200 N to 250 N against the damping means 6, 7, 8, 9, 10 in the direction of entry E, and is then caught by the locking mechanism 2, 3.

The damping means 6, 7, 8, 9, 10 thus ensures that, even in the case of high closing forces of the motor vehicle backrest latch against the latch holder 1 of, for example, 200 N or 250 N, there is no metallic contact between the metallic latch holder 1, on the one hand, and the likewise metallic latch plate 12, on the other hand, to support the locking mechanism 2, 3. For this purpose, the damping means 6, 7, 8, 9, 10 according to the exemplary embodiment is initially made of plastics material. In fact, the damping means 6, 7, 8, 9, 10 is part of the latch housing G. Since the latch housing G is usually made of a thermoplastics material and is produced by injection molding, the damping means 6, 7, 8, 9, 10 can also experience its definition during this process.

Figure 2:
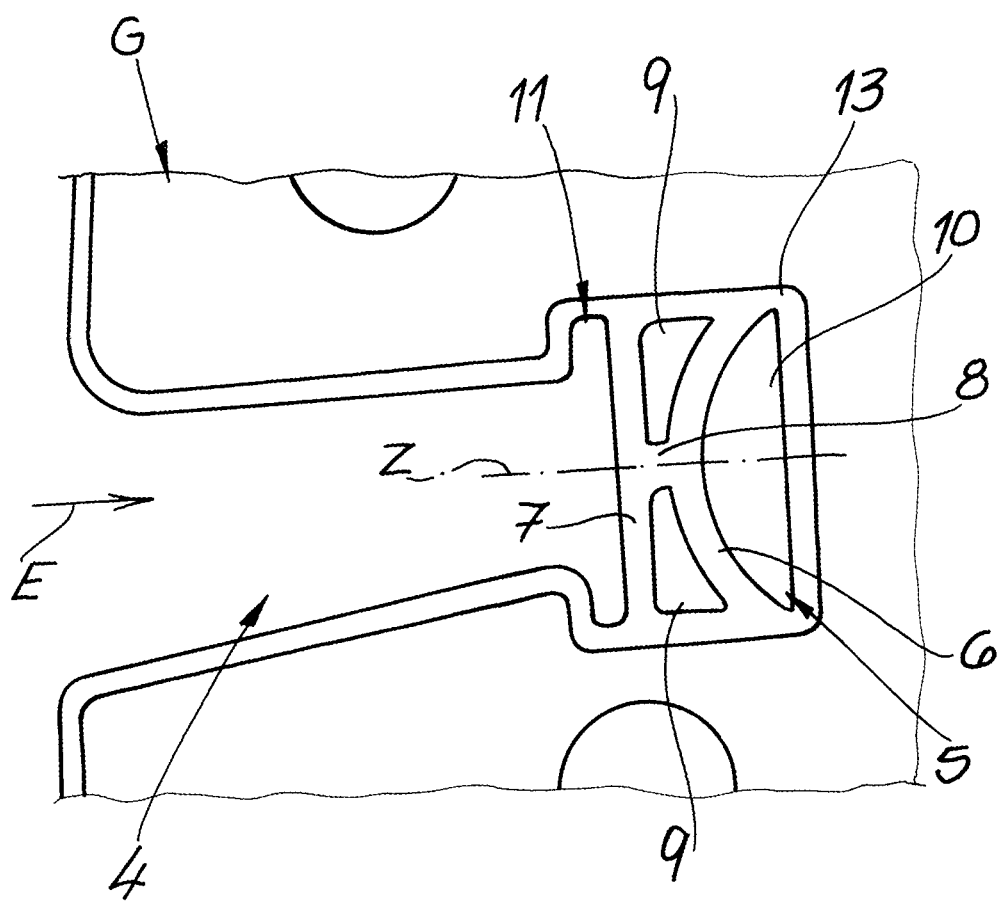
FIG. 2 shows the damping means at the end side of the recess in detail.
Figure 3:
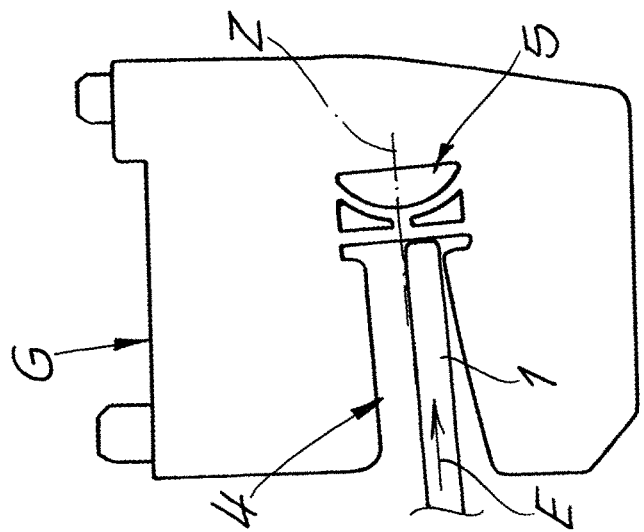
FIG. 3 shows the latch holder moving into the recess in various situations.
Figure 3:
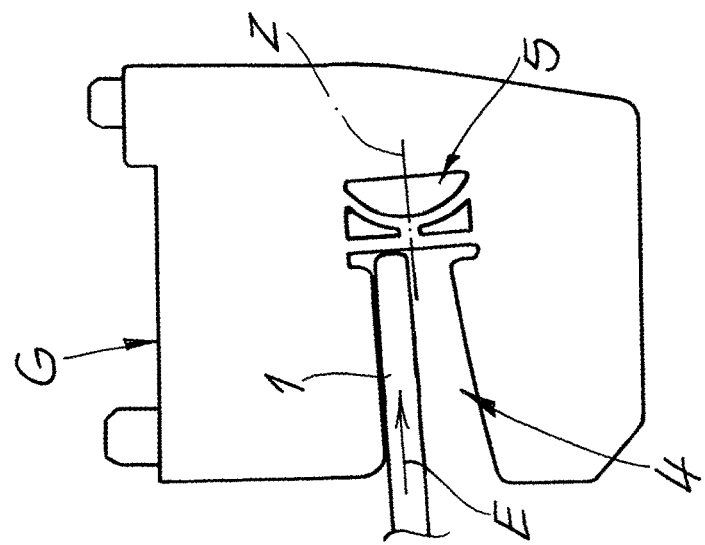
Figure 3:
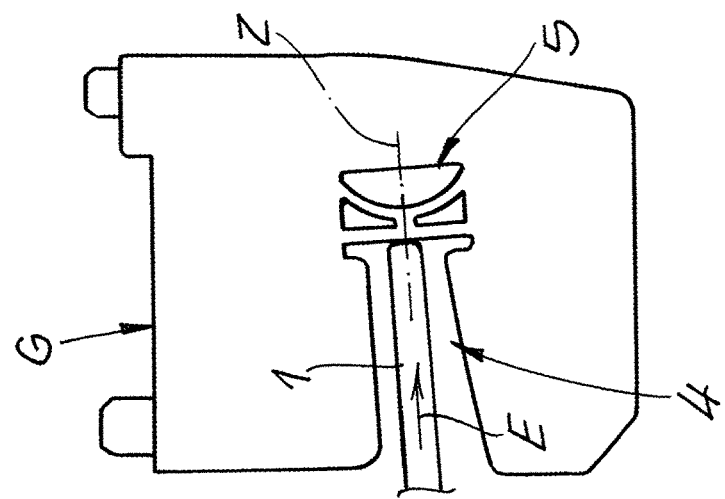

When comparing FIGS. 2 and 3, it becomes clear that the damping means 6, 7, 8, 9, 10 is initially equipped with a plurality of recesses 9, 10. In addition, the damping means 6, 7, 8, 9, 10 has at least one web 6, 7, 8.

The recesses 9, 10 ensure that the webs 6, 7, 8 can be flexibly deformed in the direction of entry E when a force is introduced by the latch holder 1 and do not break or become brittle or otherwise damaged. In other words, the webs 6, 7, 8 ensure the damping effect, on the one hand, through their macroscopic deformation, which is allowed by the recesses 9, 10 and, on the other hand, through the fact that they are made of the flexible thermoplastics material.

In detail and according to the invention, the design is such that the at least one of the webs 6, 7, 8, in this case the web 6, is designed as an arched web 6. With reference to FIGS. 2 and 3, it can be seen that the arched web 6 is curved convexly against the direction of entry E of the latch holder 1 with its highest arch. In addition to the arched web 6, a stop web 7 is also implemented for the latch holder 1 moving against it. The stop web 7 is designed as a straight web or a straight-running web. In addition, the stop web 7 extends transversely to the direction of entry E. Furthermore, the stop web 7 is supported at the end side in each case, specifically on a rectangular frame 13 that completely encloses the damping means 6, 7, 8, 9, 10.

The stop web 7 is centrally coupled to the arched web 6. For this purpose, the invention makes use of a connecting web 8. In other words, the connecting web 8 extends from the stop web 7 in the middle to the arched web 6 or to its highest arch. This is because the connecting web 8 runs in the direction of entry E of the latch holder 1. In addition, the design is such that the connecting web 8 defines or is arranged on a central line Z of the damping means 6, 7, 8, 9, 10 or the recess 4, 5.

It can be seen that the arched web 6 on the foot side and the stop web 7 are each connected at the edge side to the rectangular frame 13 already mentioned and enclosing the damping means 6, 7, 8, 9, 10. In addition, recesses 9 are realized between the arched web 6 and the stop web 7, which are separated from one another by the connecting web 8. In addition to these recesses 9, an arched recess 10 is also provided. The two L-shaped recesses 9 and the arched recess 10 together describe the largely rectangular damping means region 5. The damping means region 5 is also enclosed and delimited by the rectangular frame 13. In this case, only the front side gap 11 is additionally to be taken into account as a component of the damping means region 5.

It can be seen that the inlet mouth 4 opens in the direction of the damping means region 5 or the front side gap 11 of the damping means region 5. As a result, the damping means 6, 7, 8, 9, 10, which is also enlarged in cross section with respect to the inlet mouth 4, can particularly effectively absorb the forces exerted on it by the latch holder 1 when the locking mechanism 2, 3 is closed. At the same time, the gap S relative to the latch case 12 is still retained in accordance with the view in FIG. 4, so that any creaking noises are avoided during operation or even after prolonged use. In addition, according to the view in FIG. 3, deviations of the direction of entry E of the latch holder 1 from the previously defined central line Z can also be controlled according to the invention.

If, for example, the direction of entry E is offset from the central line Z, this only means that the latch holder 1 does not apply a force to the stop web 7 in the region of its connecting web 8 to the arched web 6, but rather to the side thereof. Nevertheless, this application of force still results in the stop web 7 being deformed and its deformations being transferred to the arched web 6 via the connecting web 8. These forces exerted on the arched web 6 in the direction of entry E are diverted from the highest arch of the arched web 6 via its two arched legs on the foot side into the frame 13 enclosing the damping means 6, 7, 8, 9, 10. In this case, large forces can also be flexibly absorbed and do not result in damage to individual webs 6, 7, 8 of the damping means 6, 7, 8, 9, 10.

LIST OF REFERENCE SIGNS

1 Latch holder
2, 3 Locking mechanism

2 Catch
3 Pawl
4, 5 Recess
4 Inlet mouth
5 Damping means region, arched recess
6 Arched web
6, 7, 8 Webs
6, 7, 8, 9, 10 Damping means
7 Stop web
8 Connecting web
9, 10 Recesses
10 Arched recess
11 Front side gap
12 Latch plate, latch case
13 Frame
E Direction of entry
S Gap
Z Central line
G Latch housing

The invention claimed is:

1. A motor vehicle latch comprising:
a locking mechanism including a catch and a pawl,
a latch housing having a recess, and a damping means located at an end side of the recess,
a latch holder entering the recess in a direction of entry transferring the locking mechanism to a closed position, thereby moving against the damping means,
wherein the damping means has a plurality of recesses and- an arched web having a highest arch that is convexly curved against the direction of entry of the latch holder,
wherein the damping means further includes a stop web against which the latch holder moves, and
wherein the stop web is centrally coupled to the arched web.

2. The motor vehicle latch according to claim 1, wherein the stop web runs transversely to the direction of entry of the latch holder.

3. The motor vehicle latch according to claim 1, wherein the stop web is supported at the end side of the recess.

4. The motor vehicle latch according to claim 1, wherein the stop web is arranged in front of the arched web in the direction of entry of the latch holder.

5. The motor vehicle latch according to claim 1, wherein the damping means further includes a frame, and the arched web is connected on a foot side and the stop web is connected on an edge side to the frame of the damping means.

6. The motor vehicle latch according to claim 1, wherein two recesses separated by a connecting web are arranged between the arched web and the stop web.

7. The motor vehicle latch according to claim 6, wherein the two recesses located between the stop web and the arched web, together with an arched recess defined by the arched web, form a rectangular central damping means region.

8. The motor vehicle latch according to claim 7, wherein the recess of the latch housing includes -an inlet mouth and the central damping means region, the inlet mouth opening into a gap and into the damping means region.

9. The motor vehicle latch according to claim 1, wherein the latch housing and the damping means are made of a plastics material, and the latch holder is made of metal.

10. The motor vehicle latch according to claim 9, wherein the latch housing and the damping means are injection molded together.

11. The motor vehicle latch according to claim 5, wherein the arched web is connected on the foot side by two legs of the arched web.

12. The motor vehicle latch according to claim 1, wherein the stop web is straight relative to a curvature of the arched web.

13. The motor vehicle latch according to claim 6, wherein the connecting web is arranged on a centerline of the damping means.

14. A motor vehicle latch comprising:
a locking mechanism including a catch and a pawl,
a latch housing having a recess, and a damping means located at an end side of the recess,
a latch holder entering the recess in a direction of entry transferring the locking mechanism to a closed position, thereby moving against the damping means,
wherein the damping means has a plurality of recesses and an arched web having a highest arch that is convexly curved against the direction of entry of the latch holder,
wherein the damping means further includes a stop web against which the latch holder moves, and
wherein the damping means further includes a frame, and the arched web is connected on a foot side and the stop web is connected on an edge side to the frame of the damping means.

15. A motor vehicle latch comprising:
a locking mechanism including a catch and a pawl,
a latch housing having a recess, and a damping means located at an end side of the recess,
a latch holder entering the recess in a direction of entry transferring the locking mechanism to a closed position, thereby moving against the damping means,
wherein the damping means has a plurality of recesses and an arched web having a highest arch that is convexly curved against the direction of entry of the latch holder,
wherein the damping means further includes a stop web against which the latch holder moves, and
wherein two recesses separated by a connecting web are arranged between the arched web and the stop web.

* * * * *